US009727099B1

(12) United States Patent
Hastings et al.

(10) Patent No.: US 9,727,099 B1
(45) Date of Patent: Aug. 8, 2017

(54) HARD DISK DRIVE MOUNTING APPARATUS

(71) Applicant: ZT Group Int'l, Inc., Secaucus, NJ (US)

(72) Inventors: Robert Hastings, Secaucus, NJ (US); Chen An, Bogota, NJ (US)

(73) Assignee: ZT GROUP INT'L, INC., Secaucus, NJ (US)

( * ) Notice: Subject to any disclaimer, the term of this patent is extended or adjusted under 35 U.S.C. 154(b) by 0 days.

(21) Appl. No.: 15/164,022

(22) Filed: May 25, 2016

(51) Int. Cl.
*G06F 1/16* (2006.01)
*G06F 1/18* (2006.01)

(52) U.S. Cl.
CPC .................... *G06F 1/187* (2013.01)

(58) Field of Classification Search
CPC ....................................... G06F 1/187
See application file for complete search history.

(56) References Cited

U.S. PATENT DOCUMENTS

| | | | | |
|---|---|---|---|---|
| 6,891,728 B1 * | 5/2005 | Mease | ............... | G06F 1/183 312/333 |
| 6,921,282 B2 * | 7/2005 | Chiou | ............... | H05K 7/1411 439/483 |
| 6,978,903 B2 * | 12/2005 | Son | ............... | G06F 1/184 211/26 |
| 7,027,309 B2 * | 4/2006 | Franz | ............... | H01R 13/62933 361/732 |
| 7,200,004 B2 * | 4/2007 | Chen | ............... | G06F 1/26 361/679.39 |
| 7,301,778 B1 * | 11/2007 | Fang | ............... | H05K 7/1487 312/223.2 |
| 7,369,403 B2 * | 5/2008 | Chen | ............... | G06F 1/184 361/679.33 |
| 9,036,341 B2 * | 5/2015 | Szelong | ............... | G06F 1/18 361/679.33 |
| 9,558,789 B1 * | 1/2017 | Van Pelt | ............... | G11B 33/127 |
| 9,609,783 B2 * | 3/2017 | Nishiyama | ............... | H05K 7/1489 |
| 2002/0104396 A1 * | 8/2002 | Megason | ............... | F16H 51/00 74/109 |
| 2006/0050487 A1 * | 3/2006 | Wu | ............... | G06F 1/184 361/724 |
| 2007/0064385 A1 * | 3/2007 | Paul | ............... | G06F 1/20 361/679.4 |
| 2007/0279858 A1 * | 12/2007 | Grady | ............... | G06F 1/183 361/641 |

(Continued)

*Primary Examiner* — Adrian S Wilson
(74) *Attorney, Agent, or Firm* — Dergosits & Noah, LLP; Todd A. Noah

(57) ABSTRACT

An HDD mounting apparatus for installing HDDs into a server device is disclosed. The mounting apparatus includes frame dimensioned to receive an HDD and fit within a drive bay with a connector positioned inside for connecting to the HDD. A top cover is secured to one of the long sides of the frame and provides a slot within which a sliding mechanism travels linearly. The sliding mechanism has an engagement mechanism to engage with an edge of the drive bay. A lever is rotatably connected to the top cover by a first hinge. A connector arm is further connected to the lever at one end, and to the sliding mechanism at a second end. When the lever is rotated in one direction, the connector arm generates a force on the sliding mechanism in the first direction that is transferred to a force on the frame in a second opposite direction.

21 Claims, 7 Drawing Sheets

(56) References Cited

U.S. PATENT DOCUMENTS

| | | | |
|---|---|---|---|
| 2008/0157638 A1* | 7/2008 | Liu | G11B 33/124 |
| | | | 312/223.2 |
| 2009/0059507 A1* | 3/2009 | Peng | G11B 33/124 |
| | | | 361/679.33 |
| 2009/0103252 A1* | 4/2009 | Peng | G11B 33/124 |
| | | | 361/679.4 |
| 2010/0187957 A1* | 7/2010 | Liang | G06F 1/187 |
| | | | 312/223.2 |
| 2016/0124471 A1* | 5/2016 | Wang | H05K 7/1417 |
| | | | 361/679.33 |

* cited by examiner

HARD DISK DRIVE MOUNTING APPARATUS

BACKGROUND

Drive bays in server devices allow for adding peripheral computer hardware devices. For example, server devices typically provide space for installing an array of data storage devices including floppy disk drives, hard-disk drives (HDDs), and CD and DVD drives. The sizes of these peripheral hardware devices have been reduced over the years in order to allow more of these devices to be installed per unit of volume within a serve device. For example, early 8" drives were reduced down to 5.25" inch drives of PCs in the 1980s, to current 3.5" drives.

Today's server devices typically employ 3.5" drives. The size designation of the drive bay size does define the volume occupied by the drive bay. Rather, the designation of the drive bay size reflects the size of the storage medium contained by the drive bay. For example, a 3.5" drive bay is named for a dimension of the HDD diskette contained within a 3.5" HDD. The drive bay itself, however, will have a larger dimension in order to receive the 3.5" drive.

With the 3.5" HDD being widely adopted as the standard drive size for server applications, the limitations as to how many drives will fit in a server are determined by two primary factors—the physical size of server and how efficiently the 3.5" HDDs can be installed onto the server. To provide for efficient installation, the design of the system must consider not only how closely each HDD on the server can be installed to each other, but also whether or not the HDDs may be installed or uninstalled with ease.

HDDs typically communicate with the server device through an interface. For example, an HDD may employ a serial ATA (SATA) standard interface. Designing for the installation process of the HDDs thus must also take into account how these interfaces of the HDD and the server are to be engaged, particularly in tight server quarters designed for efficient use of space.

Accordingly, with the persistence of the use of 3.5 HDD in server applications, there exists a need for a minimally-intrusive apparatus device for facilitating the installation of HDDs in a volume allocated by a drive bay.

DETAILED DESCRIPTION

Figure 1A:
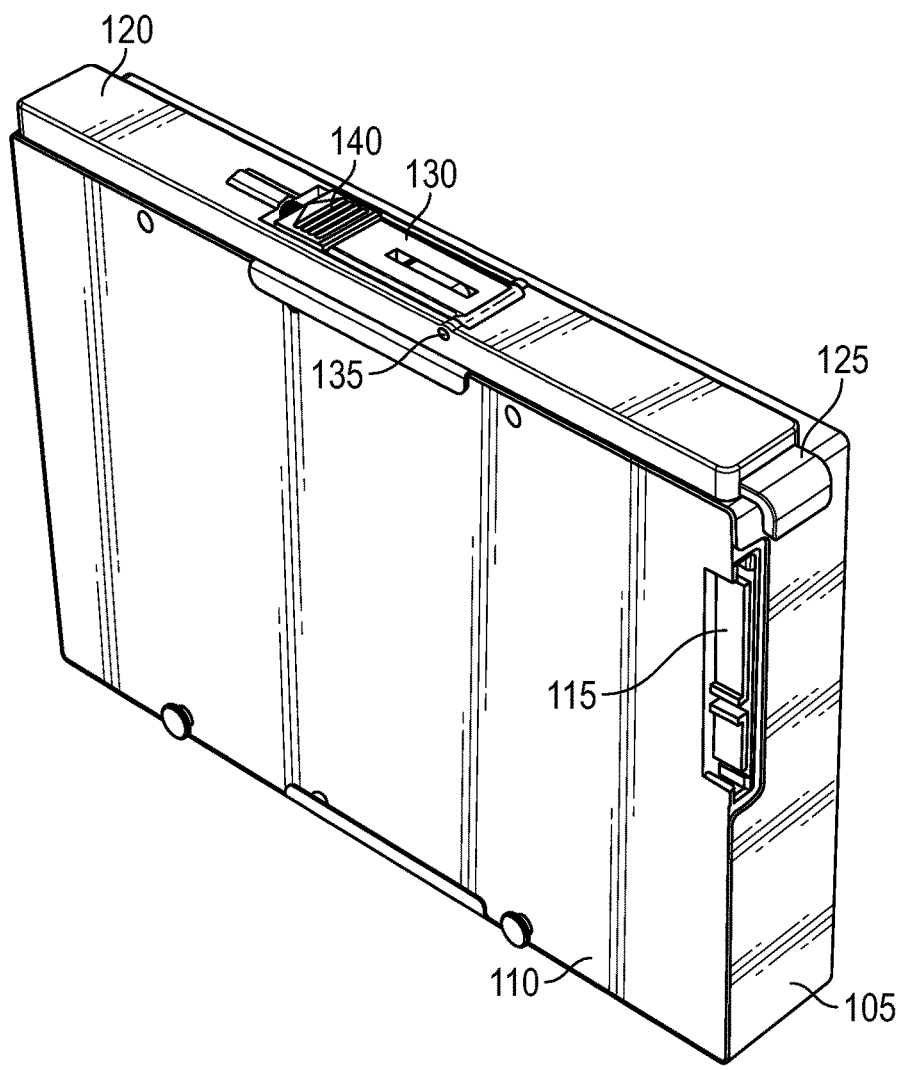
FIGS. 1A-1D are perspective drawings illustrating embodiments.

The subject matter discloses an HDD mounting apparatus that facilitates installation of an HDD device (or "module" or "drive") in a pre-defined volume ("form factor" or "space"). In an embodiment, the form factor may be that of the 3.5" drive bay. In an embodiment, the mounting apparatus may include a slot to accommodate the SATA or SAS standard interface of the HDD. In an embodiment, the mounting apparatus may allow for tool-less removal and installation of the HDD devices. In an embodiment, the mounting apparatus may provide alternative configurations in which the HDD devices may be constructed to encase the HDD device.

Embodiments of the mounting apparatus allow multiple HDD devices to be housed within close proximity from one another without compromising the physical accessibility to the HDD devices. An embodiment provides a rectangular frame dimensioned to fit within a drive bay form factor of a server device. The frame is further dimensioned to receive a hard disk drive, enclosing the HDD on at least four sides, where the four sides include first and second parallel long sides and first and second parallel short sides. The embodiment further provides a top cover that is secured to the first long side of the frame. The top cover also provides a slot for receiving a longitudinal sliding mechanism. The sliding mechanism is configured to travel longitudinally within the slot of the top cover. The sliding mechanism further includes an engagement member on one end for securing the sliding mechanism to an engagement member securing means on an edge of the drive bay of the server device when the frame is in a first operable position in the drive bay.

The embodiment also provides a lever rotatably connected to the top cover by a first hinge. A connector arm is further rotatably connected to the lever by a second hinge at a first end and to the sliding mechanism by a third hinge at a second end. When the lever is rotated in a first direction, the connector arm generates a force on the sliding mechanism in the first direction that is transferred to a force on the frame in a second opposite direction as a result of the engagement member being secured to the engagement member securing means on the edge of the drive bay. This force causes the top cover of the frame to move longitudinally within the drive bay over the secured sliding mechanism in the second direction. When the frame moves longitudinally within the drive bay, the connector of the HDD is engaged with the connector on the server device in a second operable position.

Embodiments of the mounting apparatus reduce the space required for installing HDDs into drive bays of server devices, thereby allowing more drive bays to be included per unit of space on the server devices. Embodiments further contemplate that HDD devices of other form factors may be used without departing from the scope of the subject matter of this disclosure.

In an embodiment, the mechanical design of the mounting apparatus allows for easy installation and removal of HDDs into drive bays with limited space. This includes features that allow the parts of the apparatus to physically mount the HDD drive into a corresponding connector without tools.

FIG. 1A is an illustration of an embodiment of the HDD mounting apparatus. In FIG. 1A mounting apparatus includes a rectangular frame 105 which may receive and enclose HDD 110. For example, rectangular frame 105 may be a snap-in rectangular frame which provides a form factor into which HDD 110 maybe be snapped into. Rectangular frame 105 also provides a gap where device connector 115 is exposed. In an embodiment, rectangular frame 105 is dimensioned to contain 3.5" HDD. Rectangular frame 105 is further dimensioned to fit into a pre-defined volume (length, width, height). For example, the pre-defined volume may be a drive bay dimensioned to fit 3.5"HDDs enclosed by the mounting apparatus. Rectangular frame 105, in this example, has first and second parallel long sides and first and second parallel short sides. Furthermore, rectangular frame 105 may have a cut-out on the first short side for exposing the second connector on the HDD 110 when received within the frame.

Device connector 115 may be a standardized bus connector and may be positioned at a pre-defined location with respect to rectangular frame 105. For example, Device connector 115 may be SATA or SAS connector (e.g., SATA/SAS data and power connectors), and may be used for connecting HDD 110 to a central processing unit (CPU) of a computing device, such as a personal computer or a server. The connector 115 is a computer bus interface that connects mass storage devices (e.g., 3.5" HDDS) to host bus adapters. Connector 115 provides for a compact cable size and native hot swapping.

FIG. 1A further shows top cover 120, which is rigidly secured to the first long side of rectangular frame 105. The top cover provides a slot for receiving longitudinal sliding mechanism 125. Sliding mechanism 125 is configured to travel longitudinally within the slot of the top cover. The movement of sliding mechanism 125 will become more apparent in FIG. 1B. In this example, sliding mechanism 125 includes engagement member that is an L-shape extension of sliding mechanism 125 on one end. The L-shaped engagement member may be used to engage an edge of the drive bay of the server device. For example, engagement member may be inserted into a slot at the edge of the drive bay to provide an anchor for a force to be exerted on sliding mechanism 125.

Lever 130 is rotatably connected by first hinge 135 to top cover 120 on one end. In some embodiments, lever 130 may include a spring to provide resistance against movement in the closed direction. Furthermore, lever 130 may be locked in a closed position (i.e., when lever 130 sits flush on top of the top cover 120) by spring latch 140. Spring latch 140 may also be spring loaded, thereby requiring a force to unlatch lever 130 from the closed position. When lever 130 is in the closed, as shown in FIG. 1a, sliding mechanism 125 is fully retracted.

Figure 1B:
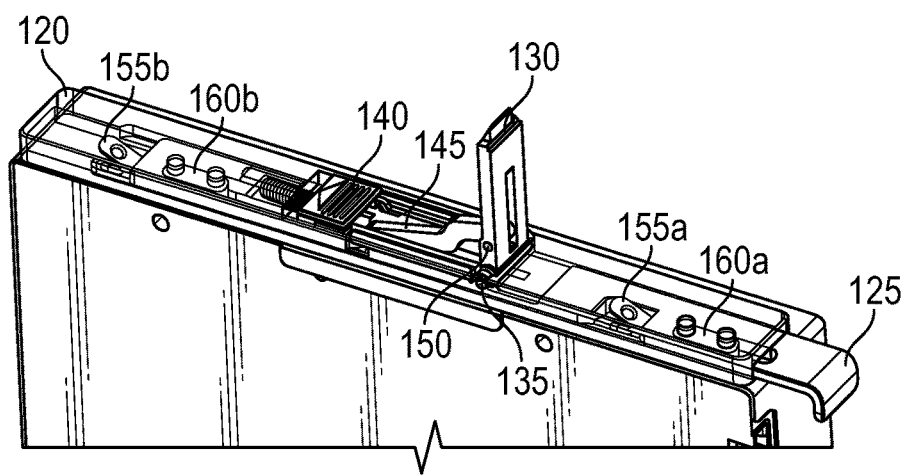

FIG. 1B provides an illustration of lever 130 being in a fully open position. As lever 130 is moved to the fully open position, sliding mechanism 125 becomes fully deployed. To produce such an action, FIG. 1B shows that connector arm 145 is connected to lever 130 via a second hinge 150 at a first end, connected to sliding mechanism 125 via a third hinge (not shown) at a second end. Connector arm 145, as shown, is connected in between the two ends of lever 130. Accordingly, when lever 130 is rotated in a first direction from the fully open position to the closed open position, connector arm 145 generates a force on the sliding mechanism in the first direction that is transferred to a force on the frame in a second opposite direction as a result of the engagement member being secured to the engagement member securing means on the edge of the drive bay. This force causes the top cover of the frame to move longitudinally within the drive bay over the secured sliding mechanism in the second direction and further causes the frame to move longitudinally within the drive bay to engage the connector of the HDD with the connector on the server device.

Conversely, when lever 130 is rotated in a second direction from the closed position to the fully open position, connector arm 145 generates a force on the sliding mechanism in the second direction that is transferred to a force on the frame in the first direction as a result of the engagement member being secured to the engagement member securing means on the edge of the drive bay. This force causes the top cover of the frame to move longitudinally within the drive bay over the secured sliding mechanism in the first direction and further causes the frame to move longitudinally within the drive bay to disengage the connector of the HDD from the connector on the server device.

When engagement member is inserted and anchored into a slot at the edge of a drive bay of a server device, a push force on sliding mechanism 125 becomes a pull force on top cover 120. Since top cover 120 is rigidly secured to rectangular frame 105, the entire mounting apparatus including rectangular frame 105 and HDD 110 is pulled in reference to sliding mechanism 125 and engagement member. For the purpose of installing HDD 110 into the drive bay of the server device, this pulling action causes device connector 115 of HDD 110 to engage a complementary connector on the server device (e.g., a male SATA connector of HDD 110 connecting with a female SATA connector on the server device). The details of this connection process will be discussed with reference to FIGS. 4-5 below.

FIG. 1B further illustrates spring locks 155a and 155b that are disposed within the space enclosed by top cover 120 and rectangular frame 105. Spring locks 155a and 155b may be constructed of deforming material such as semi-malleable metal. When in the depressed position, spring locks 155a and 155b cause HDD 110 to be locked into the rectangular frame 105. This is accomplished when the knob of spring locks 155a and 155b are depressed into the cavities on HDD 110. As shown in FIG. 1*b*, spring locks 155a and 155b may be depressed when lever 130 is moved to the closed position. As discussed above, when lever 130 is moved from the open position to the closed position, sliding mechanism 125 is moved from a fully deployed to a fully engaged position. In some embodiments, sliding mechanism 125 has two gaps such that the knobs of spring locks 155a and 155b are not depressed into the cavities when sliding mechanism 125 is in the fully deployed position. However, as sliding mechanism 125 moves from the fully deployed to the fully engaged position, the solid section of sliding mechanism 125 causes the knobs of spring locks 155a and 155b to be depressed into the cavities.

In some embodiments, slide guides 160a and 160b may also be disposed within the space enclosed by top cover 120 and rectangular frame 105. Slide guides 160a and 160b provide a physical structure along which two longitudinal tracks openings of sliding mechanism 125 may travel. Slide guides 160a and 160b enhances the horizontal stability of the travel of sliding mechanism 125 as sliding mechanism 125 moves from the fully deployed to fully engaged positions.

Figure 1C:
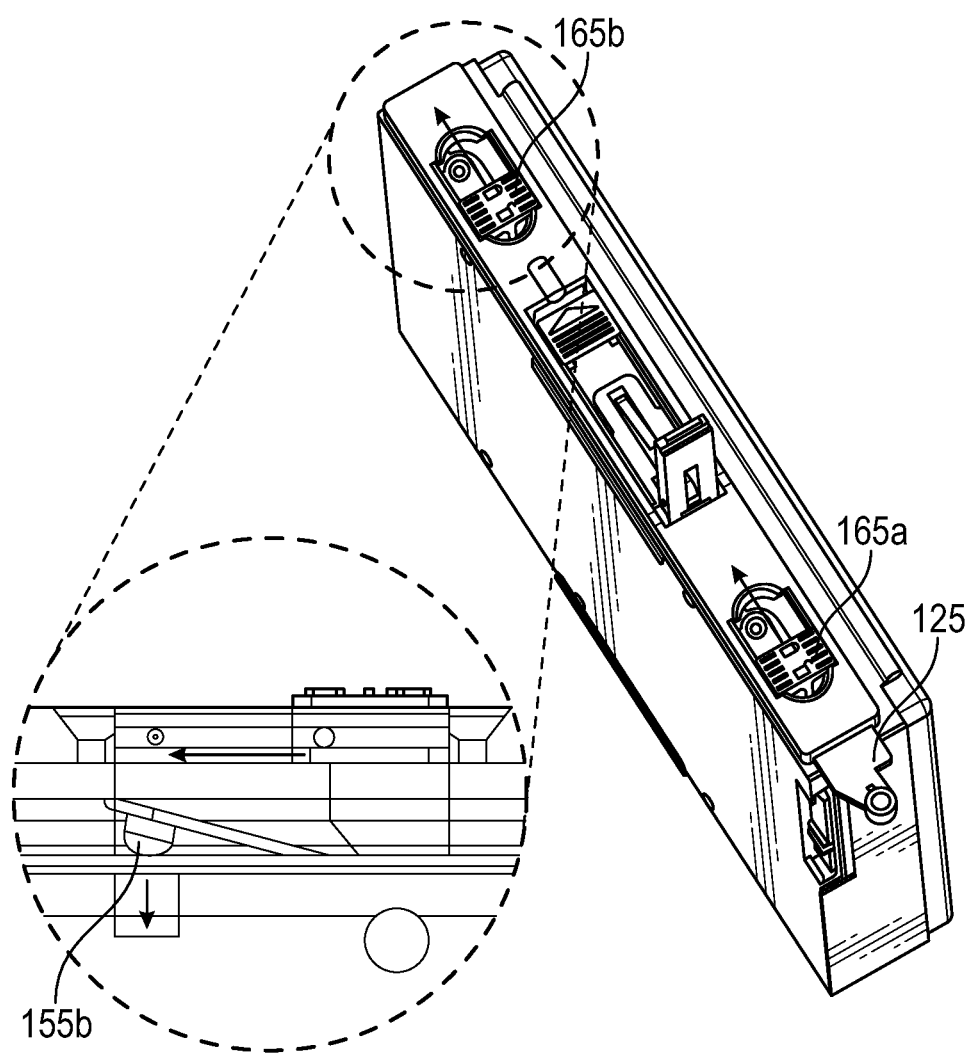

FIG. 1C provides an illustration of an alternative embodiment of deployment of spring locks 155a and 155b. In this embodiment, slide locks 165a and 165b are secured onto top cover 120, and may travel in opposing directions along the lengthwise side of the top cover. Each of slide locks 165a and 165b may be secured in an engaged or disengaged position. Similar to the function of sliding mechanism 125 in relation to spring locks 155a and 155b, when either of slide locks 165a and 165b is placed in the engaged position, the knob of that particular slide lock depresses the respective spring lock into a cavity 165 on HDD 110, thus locking HDD 110 in place. Conversely, disengaging either of slide locks 165a and 165b causes the respective spring lock to unlock HDD 110. While slide locks 165a and 165b are generally either both engaged or disengaged, this embodiment allows for slide locks 165a and 165b to be operated independently. Thus, one slide lock may be engaged while the other is disengaged, or both slide locks 165a and 165b may be engaged or disengaged together.

Figure 1D:
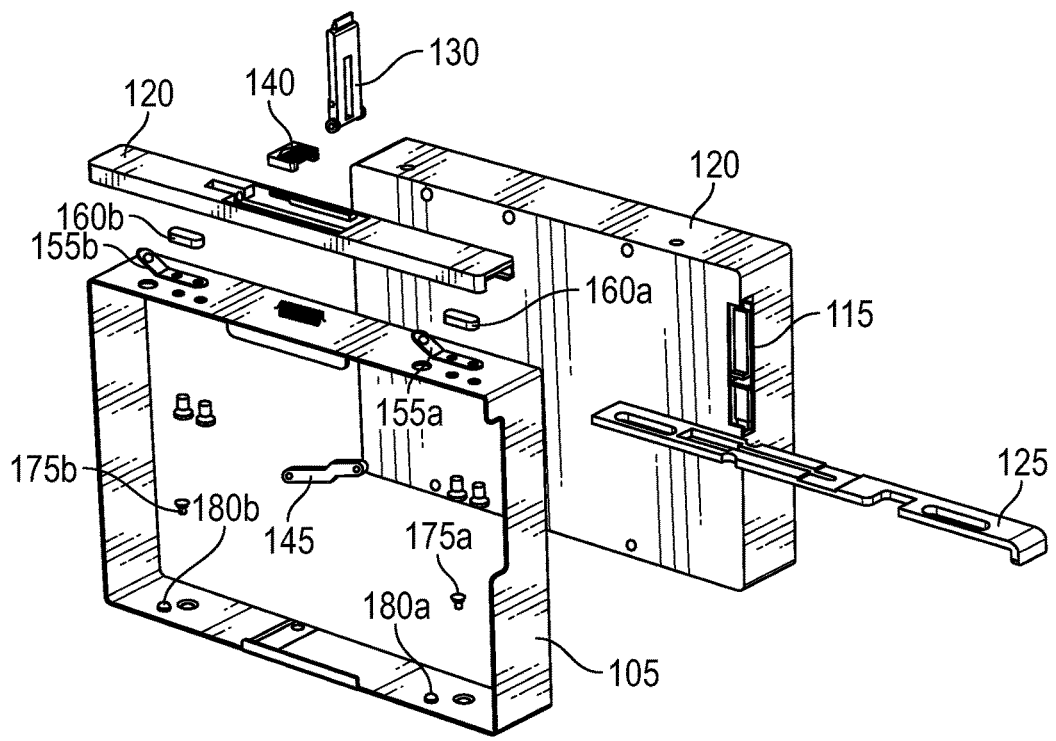

FIG. 1D provides an exploded view diagram of the mounting apparatus including HDD 110 that is to be mounted. As described above including their respective functionalities, mounting apparatus includes rectangular frame 105, onto which top cover 120 is mounted. Enclosed within top cover 120 are sliding mechanism 125, spring locks 155a and 155b, and slide guides 160a and 160b. In this illustration, slide guides 160a and 160b are secured in line with respective spring locks 155a and 155b onto rectangular frame 105. Additionally, lever 130 is attached to top cover 120 via hinge 135. In order for lever 130 to exert a force onto sliding mechanism 125, lever 130 is attached to sliding mechanism 125 by connector arm 145. Additionally, spring latch 140 is used to lock lever 130 in place when lever 130 is in the fully closed position. Mounting apparatus may also include thumb screws 175a and 175b. Thumb screws 175a and 175b may be used as guides when installing mounting apparatus into drive bay of a server device. Thumb screws 175a and 175b can be inserted into respective holes that include narrow tracks within which the stems of thumb screws 175a and 175b may travel.

As shown in FIG. 1D, rectangular frame 105 provides a gap where device connector 115 of HDD 110 is exposed. Device connector 115, as discussed above, may be a standardized bus connector and may be positioned at in a pre-defined location with respect to rectangular frame 105. The gap provides an opening from which device connector 115 of HDD 110 can engage a complementary connector on the server device. For example, a male SATA connector of HDD 110 may connect with a female SATA connector on the server device when rectangular frame 105 is fully installed and engaged into the drive bay of the server device. Additionally, the size of rectangular frame 105 is specified such that HDD 110, when installed (e.g., snapped-in), may be in contact with all four interior sides of rectangular frame 105. This contact enhances the physical security of HDD 110 into rectangular frame 105. Additionally, providing a tighter enclosure helps minimize the size of rectangular frame 105, and thus space within a server device may be used more efficiently.

Figure 2:
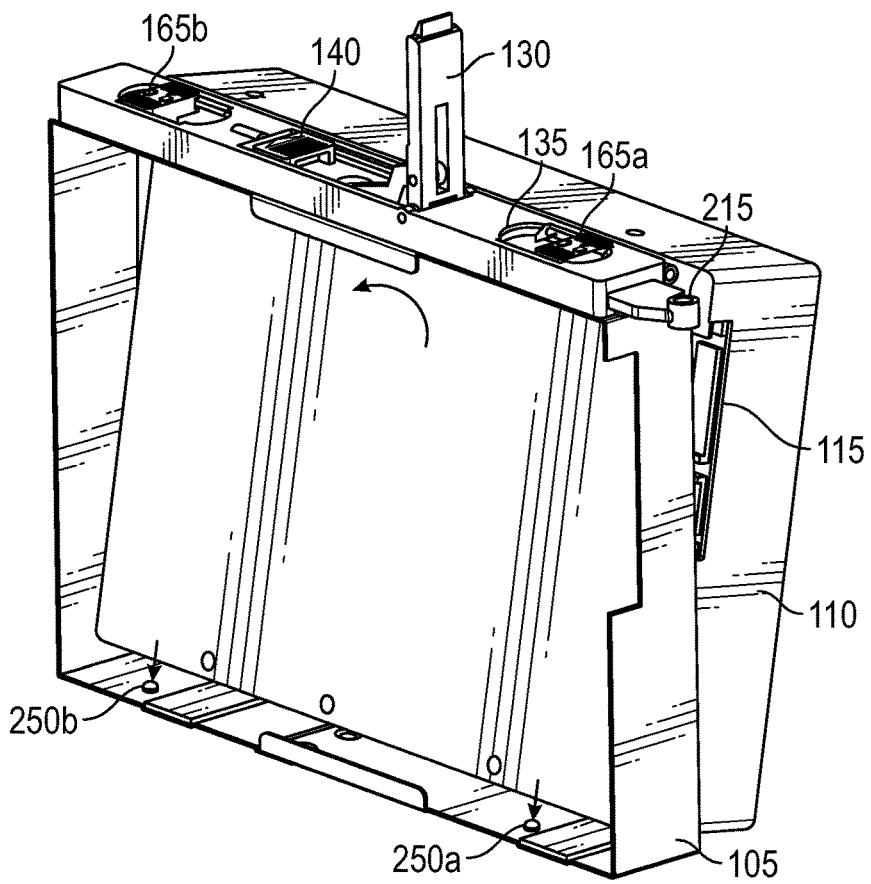
FIG. 2 provides an illustration of a device being installed into an embodiment.

FIG. 2 provides an illustration of HDD 110 being snapped into rectangular frame 105. In some embodiments, securing HDD 110 into rectangular frame 105 requires that cavities of HDD 110 (not shown in this figure) be aligned to prongs 205a and 205b of rectangular frame 105. When the cavities are not aligned with prongs 205a and 205b, HDD 110 will be slightly displaced and will not properly fit within rectangular frame 105. Rectangular frame 105 may further include rubber dampers 210a and 210b. Rubber dampers 210a and 210b provide a buffer material to dampen vibration and noise that may be created by HDD 110 and transmitted to the server device and vice versa. That is, vibration and noise from HDD 110, when in operation, may be minimized, thus also minimizing the amount of vibration and noise transmitted to the server device. Likewise, vibration and noise from other HDDs and other peripherals installed on the server device may also be dampened via rubber dampers 201a and 210b. Dampening vibrations may help prolong the operating life of the HDDs and other peripherals that may be installed on the server device.

FIG. 2 also provides an illustration of an alternative embodiment for engagement member. Instead of having an L-shaped engagement member at one end of sliding mechanism, the alternate engagement member includes cylindrical cavity 215 for receiving a cylindrical protrusion on the edge of a drive bay of a server device. When a protruding tab is received by cylindrical cavity 215, force may be applied to the protruding tab to pull mounting apparatus into place within the drive bay. While the illustration provides shows cylindrical cavity 215 to be cylindrical in shape, cylindrical cavity 215 may be of various shapes and sizes as long as the vertical passage can receive and secure a protruding tab of the server device. A detailed description of utilizing cylindrical cavity 215 to engage the protruding tab is shown in further detail in FIGS. 4-5.

Figure 3A:
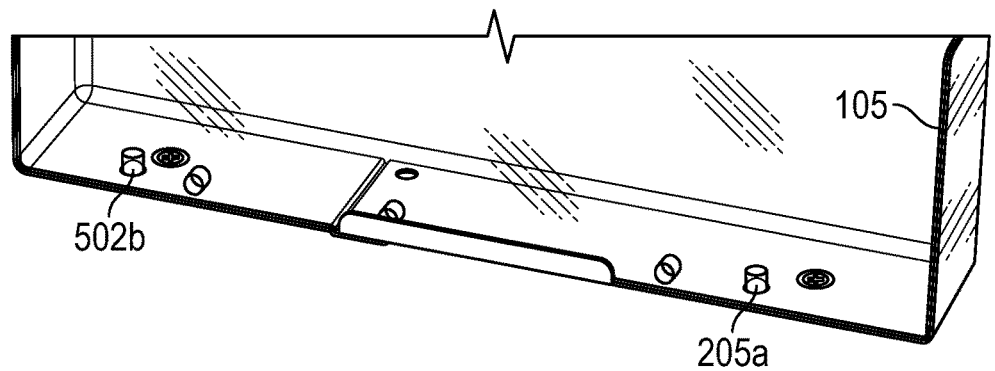
FIGS. 3A-3B provide side and bottom views of a lower portion of an embodiment.
Figure 3B:
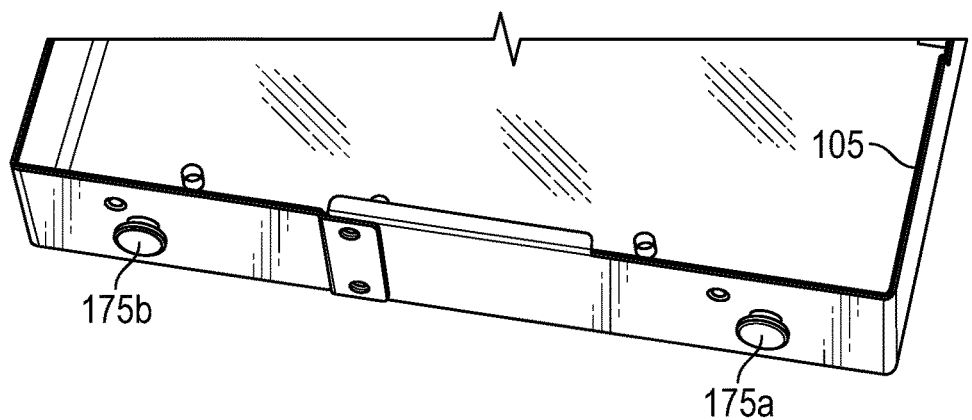

FIGS. 3A and 3B provide side view and bottom view of the lower portion of mounting apparatus. As described above in reference to FIG. 2, when HDD 110 is snapped into rectangular frame 105, the cavities of HDD 110 must be aligned to prongs 205a and 205b of rectangular frame 105. In FIG. 3a, prongs 205a and 205b of rectangular frame 105 may be disposed on the inside surface of rectangular frame 105 based on cavities of standard HDDs. For example, the cavities of HDD 110 may correspond to threaded screw holes with standardized spacing that may be used for installation of HDD 110 directly into a standardized drive bay. Alternatively, prongs 205a and 205b may be placed in customized location to support HDDs or other peripherals designed specifically for rectangular frame 105. Rectangular frame 105 may also include any number of prongs, thus not limiting the mounting apparatus to only two prongs as illustrated.

FIG. 3B provides a detailed illustration of thumb screws 175a and 175b disposed on the bottom side of mounting apparatus. As discussed above, thumb screws 175a and 175b may be used as guides when installing mounting apparatus into drive bay of a server device. Thumb screws 175a and 175b can be inserted into respective holes that include a narrow track within which the stems of thumb screws 175a and 175b may travel. For example, thumb screws 175a and 175b may be insertable into alignment holes formed in the slot of the server device. The alignment holes may have a first section with a diameter larger than that of the head of the thumb screws so as to permit the respective one of the thumb screw to pass through, and a second section which provides a track that is wider than the stem but narrower than the head of thumb screws 175a and 175b.

Mounting apparatus may first be installed in a drive bay at the disconnecting position in relation to the thumb screw alignment holes. Mounting apparatus may then moved into an engaged position where the alignment hole is reduced to a narrower passage from the first section. This movement may be performed by moving lever 130 from the open position to the closed position, thereby causing sliding mechanism 125 to be moved from a fully deployed to a fully engaged position. When sliding mechanism 125 moves to the fully engaged position, mounting apparatus is pulled towards the connectors of the server device, thus engaging connector 115 of HDD 110 with a corresponding connector of the server device in the drive bay. At the same time, thumb screws 175a and 175b will slide within the track from the disconnecting position to the engaged position, thereby further securing mounting apparatus in the drive bay.

Figure 4:
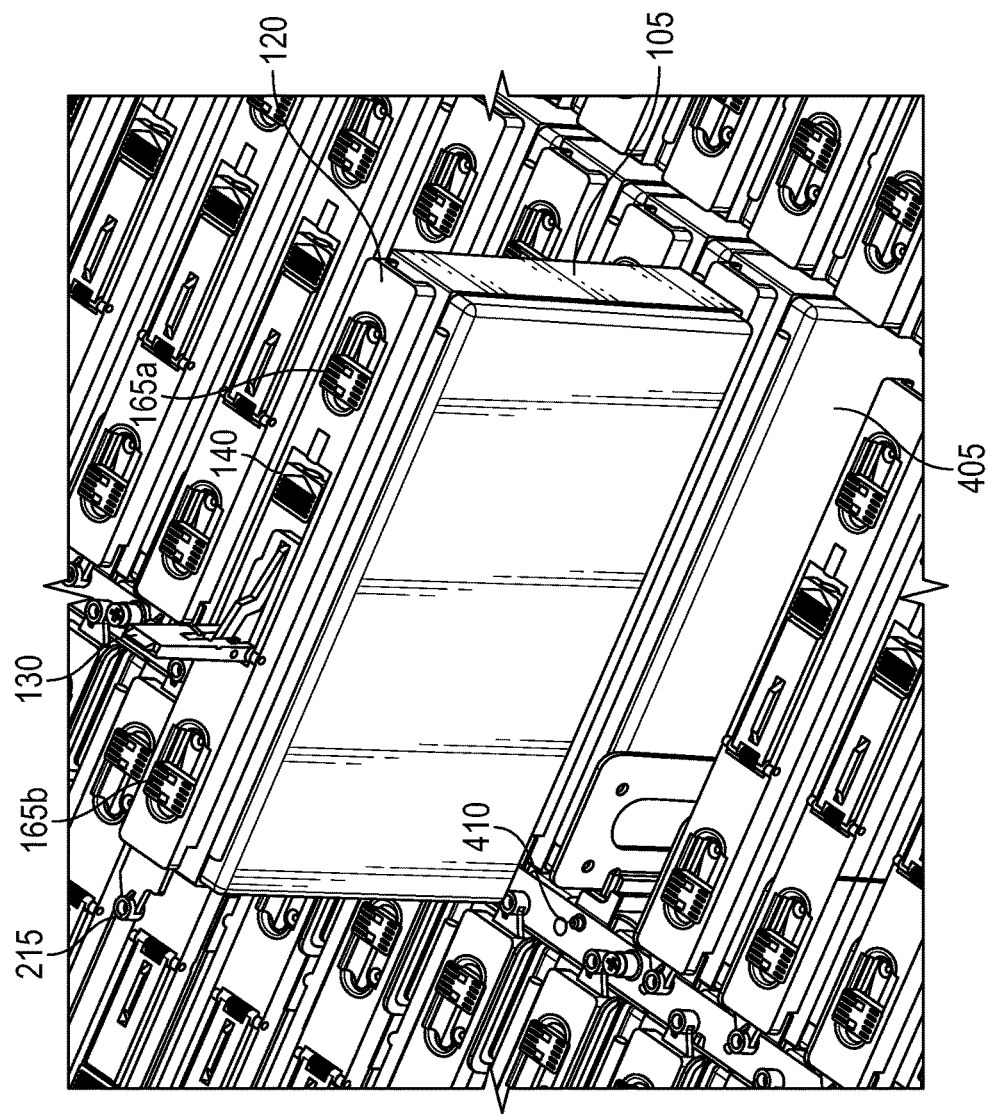
FIG. 4 provides an illustration of an embodiment being installed into a drive bay of a server device.

FIG. 4 provides an illustration of mounting apparatus being installed into drive bay 405. Drive bay 405 is designed to receive mounting apparatus. Specifically, drive bay 405 is designed to provide enough space for the mounting apparatus to travel from a disengaged position to an engaged position when lever 130 is moved from an open position to the fully closed position. The amount of space required of drive bay 405 corresponds to the length of travel of sliding mechanism 125 from a fully deployed to a fully engaged position. In other words, drive bay 405 must be wide enough such that mounting apparatus may be installed with sliding mechanism 125 being the fully deployed position as shown in the figure. The amount of space required also corresponds to an amount of space necessary for the side of mounting apparatus with connector 115 to clear the corresponding connector within the drive bay (not shown) when mounting apparatus is inserted into drive bay 405 in the disengaged position.

In the embodiment depicted in FIG. 4, the alternate engagement member with cylindrical cavity 215 is utilized. As mounting apparatus is inserted into drive bay 405, cylindrical cavity 215 is aligned with protruding tab 410 located on the edge of drive bay 405. At full insertion, cylindrical cavity 215 receives protruding tab 410 on the edge of drive bay 405. With protruding tab 410 being received by cylindrical cavity 215, force may be applied to the protruding tab to pull mounting apparatus into place within the drive bay.

Mounting apparatus may be moved into an engaged position by moving lever 130 from the open position to the closed position, thereby causing sliding mechanism 125 to be moved from a fully deployed to a fully engaged position. When sliding mechanism 125 moves to the fully engaged position, mounting apparatus is pulled in the direction of protruding tab 410, and thus engages connector 115 of HDD 110 with a corresponding connector of the server device in drive bay 405.

FIG. 4 further illustrates that a number of additional HDDs enclosed by the same mounting apparatus are installed in close proximity in adjacent drive bays of the server device. The objective of utilizing mounting apparatuses such as the one described herein is to minimize the amount of space required to install the several HDDs, thus maximizing the efficiency of space usage within a server device. For example, server devices that include tens if not hundreds of HDDs will benefit from the compact design by allowing more HDDs to be installed per server of a given physical size.

Figure 5:
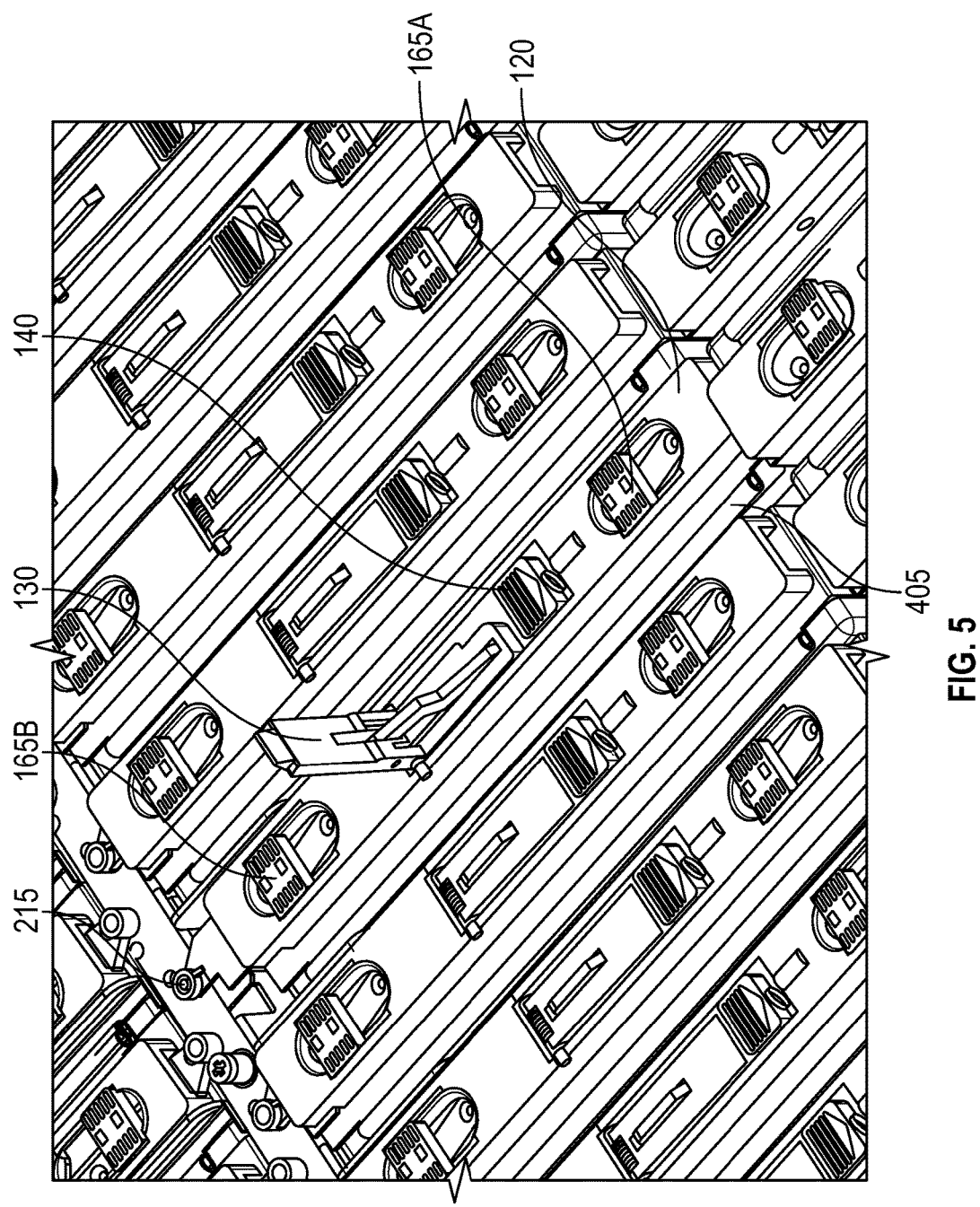
FIG. 5 provides an illustration of an inserted embodiment being moved from a disengaged position to an engaged position within a drive bay.

FIG. 5 provides an illustration of a fully inserted mounting apparatus being moved from a disengaged position to an engaged position within drive bay 405. After mounting apparatus has been fully inserted, and cylindrical cavity 215 has received protruding tab 410 of the server device, lever 130 may then be moved from the open position to the closed position. When lever 130 is moved from the fully open position to the closed position, connector arm 145 produces a push force on sliding mechanism 125 by virtue of lever 130 being connected to top cover 120 at first hinge 135. Since sliding mechanism 125 is secured to drive bay 405 by cylindrical cavity 215 which has received protruding tab 410, the push force of sliding mechanism 125 causes a pull force on top cover 120. This pull force is further exerted on the remaining components of the mounting apparatus since top cover 120 is rigidly secured the rectangular frame 105. Consequently, moving lever 130 from the open to the closed position causes a force that pulls mounting apparatus into the engaged position with drive bay 405 as demonstrated by the arrows.

FIG. 5 further shows a number of additional HDDs enclosed by the same type of mounting apparatus in the fully engaged position as the lever for each of the additional HDDs is in the fully closed position. In order to disengage mounting apparatus from drive bay 405, the steps described above may simply be reversed. More specifically, spring latch 140 may be displaces so as to unlatch lever 130, and lever 130 may subsequently be moved from the closed position to the open position. In doing so, a force is exerted by sliding mechanism 125 against protruding tab 410. This force exerted against the tab causes top cover 120 and the remaining components of mounting apparatus to push away from the connector in drive bay 405 of the server device. As connector 115 of HDD 110 is disengaged from the connector of drive bay 405, mounting apparatus 110 is also shifted into a position where rectangular frame 105 is clear of the connector of drive bay 405. Once cleared of the connector of drive bay 405, mounting apparatus may be removed by simply pulling the mounting apparatus and attached HDD 110 out of drive bay 405.

The facility of use of the mounting apparatus described herein may reduce the amount of time required to install and uninstall individual HDDs in drive bays of a server device. The functionality of the mounting apparatus as described above also allows for easy installation and removal even within tight spaces, as the engaging and disengaging of the connectors is performed by a simple movement of a lever from an open to close position.

While the mounting apparatus above is described in reference to mounting a standard 3.5 HDD, the mounting apparatus may be adapted to be used with a variety of standardized drive bay sizes, including, for example, 5.25", 3.5", 2.5", and 1.8" drive bays. Furthermore, connector 115, which is described primarily as a SATA connector, may be one of a variety of standardized bus connector (e.g., PCIe) and may be positioned with respect to rectangular frame 105 according to a standard as well. Connector 115 serves to connect HDD 110 to a CPU of a computing device, such as a personal computer or server, or some combination thereof. Furthermore, while the illustrations provided show an embodiment of the mounting apparatus being installed in a drive bay from a top down configuration, the mounting apparatus may be adaptable to server devices with drive bays in a variety of configurations.

Figure 6:
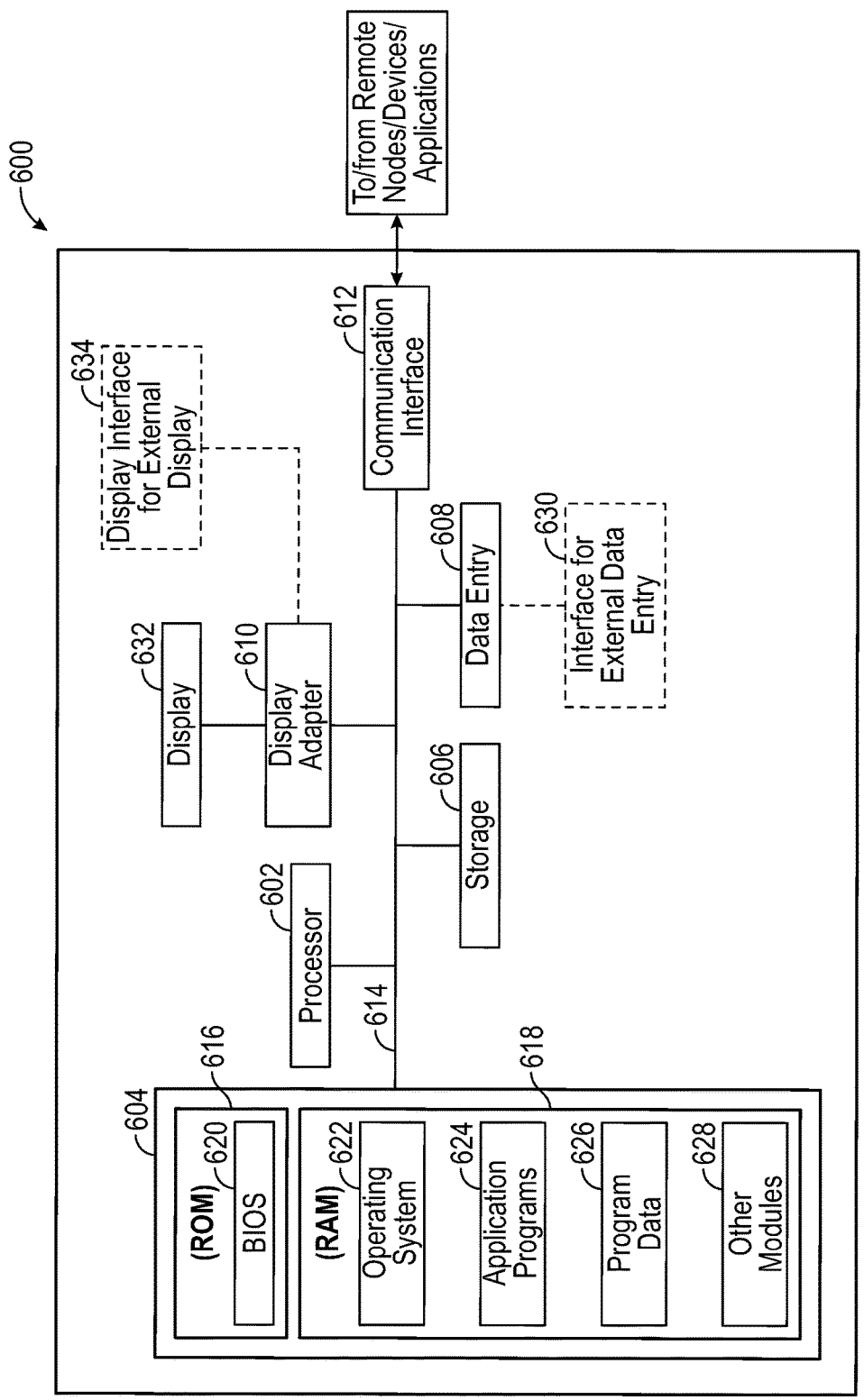
FIG. 6 is a block diagram illustrating an example system for implementing embodiments.

FIG. 6 illustrates an exemplary hardware device in which embodiments matter may be implemented. Those of ordinary skill in the art will appreciate that the elements illustrated in FIG. 6 may vary depending on the system implementation. With reference to FIG. 6, an exemplary system for implementing the embodiments disclosed herein includes a hardware device 600, including processor 602, memory 604, storage 606, data entry module 608, display adapter 610, communication interface 612, and bus 614 that couples elements 604-612 to processing unit 602.

Bus 614 may comprise any type of bus architecture. Examples include a memory bus, a peripheral bus, a local bus, etc. Processing unit 602 is an instruction execution machine, apparatus, or device and may comprise a microprocessor, a digital signal processor, a graphics processing unit, an application specific integrated circuit (ASIC), a field programmable gate array (FPGA), etc. Processing unit 602 may be configured to execute program instructions stored in memory 604 and/or storage 606 and/or received via data entry module 608.

Memory 604 may include read only memory (ROM) 616 and random access memory (RAM) 618. Memory 604 may be configured to store program instructions and data during operation of the hardware device 600. In various embodiments, memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 604 may also include nonvolatile memory technologies such as nonvolatile flash RAM (NVRAM) or ROM. In some embodiments, it is contemplated that memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in ROM 616.

Storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. Storage 606 may include an array of several storage devices, e.g. a server style device with several HDDs. The drives and their associated computer-readable media provide nonvolatile storage of computer readable instructions, data structures, program modules and other data for the hardware device 600. Storage 606 may utilize an embodiment, particularly an embodiment of mounting apparatus in which the attached modular devices are HDDs. However, since embodiments of mounting apparatus may contain other types of devices, embodiments of the mounting apparatus may be used as other purposes, for example, other modules 628, program data 626, and application programs 624.

It is noted that the methods for using the systems described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc, an SSD, and the like.

A number of program modules may be stored on storage 606, ROM 616 or RAM 618, including operating system 622, one or more applications programs 624, program data 626, and other program modules 628. A user may enter commands and information into hardware device 600 through data entry module 608. Data entry module 608 may include mechanisms such as a keyboard, a touch screen, a pointing device, etc. Other external input devices (not shown) are connected to hardware device 600 via an external data entry interface 630. By way of example and not limitation, external input devices may include a microphone, joystick, game pad, satellite dish, scanner, or the like. In some embodiments, external input devices may include video or audio input devices such as a video camera, a still camera, etc. Data entry module 608 may be configured to receive input from one or more users of hardware device 600 and to deliver such input to processing unit 602 and/or memory 604 via bus 614.

Display 632 is also connected to bus 614 via display adapter 610. The display 632 may be configured to display output of hardware device 600 to one or more users. In some embodiments, a given device such as a touch screen, for example, may function as both data entry module 608 and display 632. External display devices may also be connected to bus 614 via external display interface 634. Other peripheral output devices, not shown, such as speakers and printers, may be connected to hardware device 600.

Hardware device 600 may operate in a networked environment using logical connections to one or more remote nodes (not shown) via the communication interface 612. The remote node may be another computer, a server, a router, a peer device or other common network node, and typically includes many or all of the elements described above relative to hardware device 600. Communication interface 612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 612 may include logic configured to support direct memory access (DMA) transfers between memory 604 and other devices.

In a networked environment, program modules depicted relative to hardware device 600, or portions thereof, may be stored in a remote storage device, such as, for example, on a server. It will be appreciated that other hardware and/or software to establish a communications link between hardware device 600 and other devices may be used.

It should be understood that the arrangement of hardware device 600 illustrated in FIG. 6 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 600.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 6.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that variations of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. For example, one skilled in the art will recognize that these embodiments can be practiced without one or more of the specific details, or with other components, systems, etc. And, in other instances, there may be structures or operations not shown, or not described in detail, to avoid obscuring aspects of the described embodiments. Therefore, the scope of the appended claims should be accorded the broadest interpretation so as to encompass all such modifications and similar arrangements.

What is claimed is:

1. A hard disk drive mounting apparatus comprising:
   a rectangular shaped frame configured to receive a hard disk drive ("HDD") and fit within a rectangular drive bay form factor of a server device, the server device having a first connector positioned inside the drive bay for connecting to a second complementary connector on the HDD, the frame having first and second parallel long sides and first and second parallel short sides, the first short side having a cut-out for exposing the second connector on the HDD when received within the frame;
   a top cover secured to the first long side of the frame, the top cover providing a slot for receiving a longitudinal sliding mechanism, the sliding mechanism configured to travel longitudinally within the slot of the top cover and having an engagement member on one end for securing the sliding mechanism to an engagement member securing means on an edge of the drive bay of the server device when the frame is in a first operable position in the drive bay;
   a lever rotatably connected to the top cover by a first hinge; and
   a connector arm rotatably connected to the lever by a second hinge at a first end of the connector arm and to the sliding mechanism by a third hinge at a second end of the connector arm, such that when the lever is rotated in a first direction, the connector arm generates a force on the sliding mechanism in the first direction that is transferred to a force on the frame in a second opposite direction as a result of the engagement member being secured to the engagement member securing means on the edge of the drive bay, thereby causing the top cover of the frame to move longitudinally within the drive bay over the secured sliding mechanism in the second direction and further causing the frame to move longitudinally within the drive bay and engage the connector of the HDD with the connector on the server device in a second operable position.

2. The hard disk drive mounting apparatus of claim 1, wherein when the lever is rotated in the second direction, the connector arm generates a force on the sliding mechanism in the second direction that is transferred to a force on the frame in the first direction as a result of the engagement member being secured to the engagement member securing means on the edge of the drive bay, thereby causing the top cover of the frame to move longitudinally within the drive bay over the secured sliding mechanism in the first direction and further causing the frame to move longitudinally within the drive bay and disengage the connector of the HDD from the connector on the server device in the first operable position.

3. The hard disk drive mounting apparatus of claim 1, wherein the lever is flush with the top cover when fully rotated in the first direction.

4. The hard disk drive mounting apparatus of claim 2, wherein the lever is perpendicular to the top cover when fully rotated in the second direction.

5. The hard disk drive mounting apparatus of claim 1, wherein the lever includes a spring to provide resistance against movement in the first direction.

6. The hard disk drive mounting apparatus of claim 1, further comprising a spring latch attached to top cover, the spring latch locks the lever when the lever is fully rotated in the first direction.

7. The hard disk drive mounting apparatus of claim 1, further comprising one or more thumb screws that protrude downwardly from the second long side of the frame, each of the one or more thumb screws including a stem and a head on one end of the stem, wherein the stem is connected to the second long side of the frame on the one end opposite of the head, and wherein the head has an larger diameter than the stem.

8. The hard disk drive mounting apparatus of claim 7, wherein the one or more thumb screws are insertable into one or more alignment holes formed in of the drive bay of the server device, the one or more alignment holes having a first section with a diameter larger than that of a head of a respective one of the thumb screws so as to permit the respective one of the thumb screws to pass through, and the one or more alignment holes having a second section providing tracks that are wider than the stem but narrower than the head of the one or more thumb screws, the track for securing the thumb screw to the server device when engaged.

9. The hard disk drive mounting apparatus of claim 1, further comprising one or more spring locks disposed within a space enclosed by the top cover and the frame, the one or more spring locks, when depressed, causes the HDD to be locked into the enclosure.

10. The hard disk drive mounting apparatus of claim 9, wherein the sliding mechanism includes one or more gaps for accommodating the one or more spring locks in a undepressed position, and wherein when the sliding mechanism is pulled in the first direction, the disposition of the mechanism causes the one or more spring lock to be depressed into an engaged position.

11. The hard disk drive mounting apparatus of claim 9, further comprising one or more slide locks disposed on the top cover, wherein the one or more spring locks is depressed by the one or more slide locks when the respective one or more slide locks is placed into a locked position.

12. The hard disk drive mounting apparatus of claim 1, wherein the sliding mechanism includes one or more longitudinal track openings, the hard disk drive mounting apparatus further comprising one or more slide guides disposed within a space enclosed by the top cover and the frame, the one or more slide guides providing physical structures along which the longitudinal track openings on the sliding mechanism travels.

13. The hard disk drive mounting apparatus of claim 1, further comprising one or more rubber dampers disposed on an inside surface of the at least one of the first and second parallel long sides and the first and second parallel short sides of the frame, the one or more rubber dampers providing a buffer material to dampen vibration and noise created by the enclosed HDD.

14. The hard disk drive mounting apparatus of claim 1, wherein the HDD connector includes serial ATA standard interface connection pins.

15. The hard disk drive mounting apparatus of claim 1, wherein the HDD is a standard 3.5" HDD.

16. The hard disk drive mounting apparatus of claim 1, wherein an inside surface of the at least one of the first and second parallel long sides and the first and second parallel short sides of the frame includes one or more prongs, the one or more prongs corresponding to cavities of the enclosed HDD, wherein the one or more prongs provide an alignment tool for securing the HDD into the enclosure.

17. The hard disk drive mounting apparatus of claim 1, wherein the engagement member is formed as an L-shaped extension of the sliding mechanism.

18. The hard disk drive mounting apparatus of claim 17, wherein the engagement member securing means is a slot on the edge of the drive bay of the server device into which the engagement member may be inserted for anchoring the sliding mechanism to the drive bay of the server device.

19. The hard disk drive mounting apparatus of claim 1, wherein the engagement member is formed as a cylindrical receiving cavity at the end of the sliding mechanism.

20. The hard disk drive mounting apparatus of claim 19, wherein the engagement member securing means is a cylindrical protrusion from the edge of the drive bay of the server device, the cylindrical protrusion having a diameter smaller than the cylindrical receiving cavity of the sliding mechanism.

21. The hard disk drive mounting apparatus of claim 20, wherein the engagement member securing means is inserted into the engagement member in order to anchor the sliding mechanism to the drive bay of the server device.

* * * * *